3,526,671
AMINOALKYLATED OXIMES OF DIBENZO[a,d]
CYCLOHEPTEN-5-ONES
Claude I. Judd, Mequon, Wis., assignor to Colgate-Palmolive Company, New York, N.Y., a corporation of Delaware
No Drawing. Continuation-in-part of application Ser. No. 467,720, June 28, 1965. This application May 22, 1967, Ser. No. 640,351
Int. Cl. C07c *131/02*
U.S. Cl. 260—566                                6 Claims

ABSTRACT OF THE DISCLOSURE

The compounds are aminoalkylated oximes of dibenzo-[a,d]cyclohepten - 5 - ones which are useful as skeletal muscle relaxants and antidepressants. Two species disclosed are O - [β-(N,N-dimethylamino)ethyl]10,11-dihydrodibenzo[a,d]cyclohepten-5 - one and O - [β-(N,N-dimethylamino)ethyl] - dibenzo[a,d]cyclohepten - 5 - one oxime.

RELATED CASES

The present application is a continuation-in-part of my two earlier copending applications Ser. No. 537,677 filed Mar. 28, 1966, now U.S. Pat. No. 3,349,128 and Ser. No. 467,720 filed June 28, 1965, now abandoned.

BRIEF SUMMARY OF THE INVENTION

The compounds may be represented by the following formula:

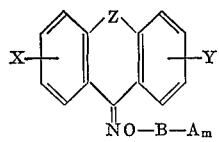

and non-toxic physiologically acceptable acid addition salts in which Z may be either —CH=CH— or

—CH$_2$—CH$_2$

X and Y represent hydrogen or one or more ring substituents such as a halogen, particularly chlorine, a lower alkyl containing from one to four carbon atoms such as methyl, ethyl, propyl or butyl, an S-lower alkyl containing from one to four carbon atoms such as thiomethyl, thioethyl, thiopropyl, thiobutyl, an O-lower alkyl containing from one to four carbon atoms such as methoxy, ethoxy, isopropyloxy, butyloxy and methylenedioxy, trifluoromethyl, B represents a straight or branched lower alkylene containing from one to eight carbon atoms such as methylene, ethylene and propylene, and Am represents an amino group such as

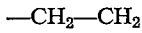

wherein R$_1$ and R$_2$ may be hydrogen, a lower alkyl containing from one to four carbon atoms such as methyl, ethyl, propyl and butyl, phenyl and phenyl-lower alkyls such as benzyl, phenylethyl and cyclic amino groups such as piperazino, 4-lower alkyl piperazino, particularly 4-methyl piperazino, 4-hydroxy lower alkyl piperazino, particularly 4-hydroxy ethyl piperazino, pyrrolidino and piperidino.

The novel aminoalkylated oximes of dibenzo[a,d]-cyclohepten-5-ones may be prepared by reacting a dibenzo[a,d]cyclohepten - 5 - one with hydroxylamine to form a dibenzo[a,d]cyclohepten - 5 - one oxime, forming an anion of the oxime by treating it with a base and reacting the oxime anion with an aminoalkyl ester such as an aminoalkyl halide or an aminoalkyl tosylate. This process can be represented as follows

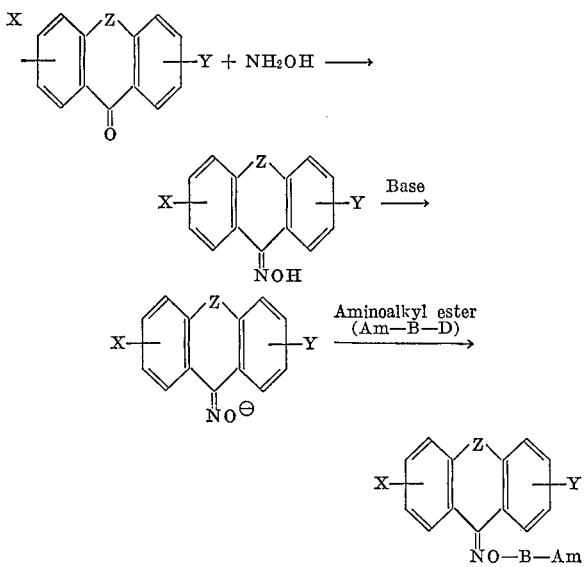

wherein X, Y, Z, B and Am have the significance previously assigned except that Am cannot represent a primary or secondary amino group such as when either or both of R$_1$ or R$_2$ are hydrogen, and wherein D is a halogen such as chlorine or bromine or a tosyloxy group.

Illustrative examples of some of the dibenzo[a,d] cyclohepten-5-ones which may be employed as starting materials in the process are:

dibenzo[a,d]cyclohepten-5-one,
10,11-dihydrodibenzo[a,d]cyclohepten-5-one,
3-chloro-10,11-dihydrodibenzo[a,d]cyclohepten-5-one,
7-methoxy-10,11-dihydrodibenzo[a,d]cyclohepten-5-one,
3-ethyl-10,11-dihydrodibenzo[a,d]cyclohepten-5-one,
3,7-dichloro-10,11-dihydrodibenzo[a,d]cyclohepten-5-one,
2,3,7,8-tetrachloro-10,11-dihydrodibenzo[a,d]cyclohepten-5-one,
2-thiomethyl-10,11-dihydrodibenzo[a,d]cyclohepten-5-one,
3-trifluoromethyl-10,11-dihydrodibenzo[a,d]cyclohepten-5-one,
3,7-dichlorodibenzo[a,d]cyclohepten-5-one, and
2,3-methylenedioxydibenzo[a,d]cyclohepten-5-one.

These dibenzo[a,d]cyclohepten-5-ones may be prepared in accordance with the process disclosed by A. C. Cope and S. W. Fenton in the Journal of the American Chemical Society, 73, 1673 (1951).

The oximes are prepared by treating the dibenzo[a,d] cyclohepten-5-ones with a hydroxylamine salt such as hydroxylamine hydrochloride in the presence of a suitable base such as pyridine, sodium acetate or sodium hydroxide. The reaction is readily effected employing conventional conditions of solvent, temperature, and the like. A preferred procedure employs excess base such as pyridine as an organic solvent and heating the mixture to reflux. A method for preparing 10,11 - dihydrodibenzo[a,d]cyclohepten-5-one oxime is shown by Monro, et al. in the Journal of Medicinal Chemistry, 6, 255–261 (1963).

The dibenzo[a,d]cyclohepten-5 - one oxides are converted into their oxime anions by treating them with a base such as sodium hydride, sodamide, sodium hydroxide or potassium hydroxide. The oxime anion is then allowed to react with an aminoalkyl ester to form the final aminoalkyl-dibenzo[a,d]cyclohepten-5-one oximes. The reaction with aminoalkyl ester is advisedly conducted in an organic reaction medium such as toluene. The reaction is promoted by the use of elevated temperatures, particularly advantageous is the reflux temperature. The reaction is generally completed in from one to four hours. The reaction mixture is then cooled and the product is isolated by conventional means such as by extracting with a solvent. These bases may be converted into their nontoxic physiologically acceptable acid addition salts by treating the bases in the presence of an inorganic or organic acid such as hydrochloric acid, maleic acid or fumaric acid.

Examples of the aminoalkyl esters which may be employed in this reaction are:

β-(N,N-dimethylamino)ethyl chloride,
β-(N,N-dimethylamino)ethyl tosylate,
β-(4-methyl-1-piperazinyl)ethyl chloride,
β-(4-hydroxyethyl-1-piperazinyl)ethyl bromide,
β-(N-benzyl-N-methylamino)ethyl chloride,
β-(N,N-dibenzylamino)propyl chloride,
γ-(N,N-dimethylamino)propyl chloride,
β-(1-pyrrolidyl)ethyl chloride,
γ-(1-piperidyl)propyl chloride.

Some of the aminoalkyl-dibenzo[a,d]cyclohepten-5-one oximes which may be prepared in this fashion are:

O-[β-(N,N-dimethylamino)ethyl]-10,11-dihydrodibenzo[a,d]cyclohepten-5-one oxime,
O-[β-(4-methyl-1-piperazinyl)ethyl]-10,11-dihydrodibenzo[a,d]cyclohepten-5-one oxime,
O-[β-(N-benzyl-N-methylamino)ethyl]-10,11-dihydrodibenzo[a,d]cyclohepten-5-one oxime,
O-[γ-(N,N-dimethylamino)propyl]-10,11-dihydrodibenzo[a,d]cyclohepten-5-one oxime,
O-[β-(N-benzyl-N-methylamino)ethyl]-dibenzo[a,d]cyclohepten-5-one oxime,
O-[β-(N,N-dimethylamino)ethyl]-3-chloro-10,11-dihydrodibenzo[a,d]cyclohepten-5-one oxime,
O-[β-(4-methyl-1-piperazinyl)ethyl]-3-chloro-10,11-dihydrodibenzo[a,d]cyclohepten-5-one oxime,
O-[β-(1-pyrrolidyl)propyl]-3,7-dimethoxy-10,11-dihydrodibenzo[a,d]cyclohepten-5-one oxime, and
O-[γ-(1-piperidyl)butyl]-2,3,7,8-tetramethyldibenzo[a,d]cyclohepten-5-one oxime.

Compounds of this invention having a hydrogen on the aminonitrogen may be prepared utilizing an appropriate amino-protecting group such as an acyl group which can be removed using standard techniques after the O-aminoalkyl chain has been added to the dibenzo[a,d]cyclohepten-5-one oxime.

A particularly desirable acyl blocking group is $\alpha,\alpha,\alpha$-trifluoroacetyl and the synthesis is accomplished by treating an appropriate oxime anion, prepared as previously described, with a N-haloloweralkyl-N-loweralkyl-$\alpha,\alpha,\alpha$-trifluoroacetamide to form the trifluoroacetamide derivative and then hydrolytically cleaving the acyl group to prepare the corresponding secondary amine.

Some of the compounds which may be prepared in this fashion are:

O-[β-(N-methylamino)ethyl]-10,11-dihydrobenzo[a,d]cyclohepten-5-one oxime,
O-[β-(N-methylamino)ethyl]-dibenzo[a,d]cyclohepten-5-one oxime,
O-[β-(N-methylamino)propyl]-10,11-dibenzo[a,d]cyclohepten-5-one oxime,
O-[β-(N-methylamino)propyl]-dibenzo[a,d]cyclohepten-5-one oxime,
O-[β-(N-ethylamino)ethyl]-10,11-dibenzo[a,d]cyclohepten-5-one oxime, and
O-[β-(N-propylamino)ethyl]-dibenzo[a,d]cyclohepten-5-one oxime.

The compounds of this invention which are unsymmetrical because of the placement of the ring substituents X and Y exist in isomeric forms known as syn and anti.

The aminoalkyl-dibenzo[a,d]cyclohepten-5-one oximes of this invention as well as their physiologically acceptable acid addition salts are skeletal muscle relaxants and thus are useful in the control of skeletal muscle pain, lower back pain and muscle stiffness. The compounds of this invention also possess sedative and antidepressant activities.

The compound O-[β-(N,N-dimethylamino)ethyl]-10,11-dihydrobenzo[a,d]cyclohepten-5-one oxime was found to be effective as a skeletal muscle relaxant when administered at a dose level of 2 mg./kg. in the standard "spinal cat" preparation, i.e. cats in which the spinal cord had been cut at the neck to eliminate any influence from the brain.

In behavioral studies, cats receiving 0.3 mg./kg. of the compound showed general behavioral effects, including sedation with an increase in sleep duration, which resembled those observed when known antidepressants were administered in similar experiments. Similar results were observed in mouse behavioral studies at relatively low doses (0.3 to 10 mg./kg.). In the standard rat isolated vas deferens procedure, the compound was found to potentiate norepinepherine spasmogenic activity in relative low bath concentrations (2.0–5.0 mg./ml.) in a manner which was also similar to that shown by known antidepressants.

The compounds O-[β-(4-methyl-1-piperazinyl)ethyl]-10,11-dihydrodibenzo[a,d]cyclohepten-5-one oxime, O-[β-(N-benzyl-N-methylamino)ethyl]-10,11-dihydrodibenzo[a,d]cyclohepten-5-one oxime, O-[β-(N,N-dimethylamino)ethyl]-3-chloro-10,11-dihydrodibenzo[a,d]cyclohepten-5-one oxime and O-[β-(N-methylamino)ethyl]-10,11-dihydrodibenzo[a,d]cyclohepten-5-one oxime likewise gave general behavioral profiles in cats or mice which resembled that of the known antidepressants when administered at doses of approximately 10 mg./kg.

The aminoalkyl-dibenzo[a,d]cyclohepten-5-one oximes disclosed in this application as well as their salts may be administered to animals and humans as pure compounds. It is advisable, however, to first combine one or more of the compounds with a suitable pharmaceutical carrier to attain a more satisfactory size to dosage relationship. Either liquid or solid pharmaceutical carriers may be employed.

Unit dosage forms such as tablets and capsules may contain any suitable predetermined amount of one or more of the active agents described in this application and may be administered one or more at a time at regular intervals. Such unit dosage forms, however, should generally contain a concentration of from 0.1% to 10% by weight of one or more of the active agents. Unit dosage forms should advisedly contain between 5 to 150 mg. of the active agent.

A typical tablet may have the following composition:

|   |   | Mg. |
|---|---|---|
| (1) | O-[γ-(N,N-dimethylamino)propyl]-10,11-dihydrodibenzo[a,d]cyclohepten-5-one oxime fumarate | 10 |
| (2) | Starch U.S.P. | 57 |
| (3) | Lactose U.S.P. | 73 |
| (4) | Talc U.S.P. | 9 |
| (5) | Stearic acid | 6 |

Powders (1), (2) and (3) are slugged, then granulated, mixed with (4) and (5) and tableted.

The oral route is generally preferred for administering the compounds of this invention. However, other routes of administration such as parenteral may be employed.

The following examples are presented to illustrate this invention.

EXAMPLE I

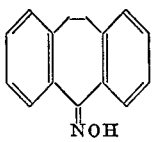

10,11-dihydrodibenzo[a,d]cyclohepten-5-one oxime

A mixture of 20.8 g. (0.1 mole) 10,11-dihydrodibenzo-[a,d]cyclohepten-5-one, 20.8 g. (0.3 mole) hydroxylamine hydrochloride and 300 ml. pyridine are stirred at reflux for twenty-four hours. The mixture is evaporated under reduced pressure and suspended in water. The insoluble organic portions are extracted into ethyl ether and the ether is washed with five percent hydrochloric acid, five percent sodium bicarbonate and water. After drying over anhydrous potassium carbonate the solution is filtered and the filtrate evaporated under reduced pressure. The residues are triturated with Skelly B and the solids collected by filtration yielding the product, M.P. 163–166°.

Analysis.—Calcd. for $C_{15}H_{13}NO$ (percent): N, 6.28. Found (percent): N, 5.96.

EXAMPLE II

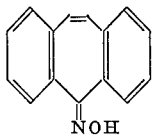

Dibenzo[a,d]cyclohepten-5-one oxime

A mixture of 4.1 g. (0.02 mole) dibenzo[a,d]cyclohepten-5-one, 4.2 g. (0.06 mole) hydroxylamine hydrochloride and 75 ml. pyridine is heated under reflux for eighteen hours. The mixture is evaporated under reduced pressure, covered with ether and washed with 5% hydrochloric acid, 5% sodium hydroxide and water. The organic material is dried over anhydrous potassium carbonate, filtered and evaporated under reduced pressure. The residues are triturated under Skelly B and collected by filtration yielding the product, M.P. 184–185°.

Analysis.—Calcd. for $C_{15}H_{11}NO$ (percent): C, 81.43; H, 5.01. Found (percent): C, 81.38; H, 4.95.

EXAMPLE III

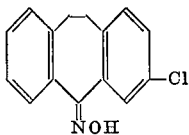

3-chloro-10,11-dihydrodibenzo[a,d]cyclohepten-5-one oxime

A mixture of 65.3 g. (0.27 mole) 3-chloro-10,11-dihydrodibenzo[a,d]cyclohepten-5-one, 56.3 g. (0.81 mole) hydroxylamine hydrochloride and 800 ml. pyridine is stirred at reflux for 12 hours. The solvents are removed under reduced pressure and the residues are covered with one liter of ether and washed with 250 ml. portions of 3 N hydrochloric acid, 5% sodium hydroxide and water. The dried organic fraction is evaporated and the residues are triturated in Skelly B and collected by filtration, yielding the product. Further recrystallization from acetonitrile and Darco yields the product, M.P. 198–201°.

Analysis.—Calcd. for $C_{15}H_{12}ClNO$ (percent): C, 69.91; H, 4.70; N, 5.44; Cl, 13.76. Found (percent): C, 69.91; H, 4.70; N, 5.34; Cl, 13.79.

EXAMPLE IV

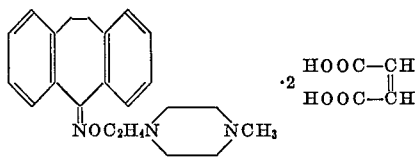

O-[β-(4-methyl-1-piperazinyl)ethyl]-10,11-dihydrodibenzo[a,d]cyclohepten-5-one oxime An aqueous solution of 16.8 g. (0.075 mole) 4-methyl-1-piperazinylethylchloride dihydrochloride is covered with 100 ml. toluene and saturated with potassium carbonate. The aqueous fraction is washed repeatedly with toluene, the toluene fractions are combined, dried and filtered.

A mixture of 11.2 g. (0.05 mole) 10,11-dihydrodibenzo[a,d]-cyclohepten-5-one oxime and 2.4 g. (0.05 mole) 50% sodium hydride in 100 ml. dry toluene is stirred at reflux for one hour, cooled to 25° C. and the above solution of 4-methyl-1-piperazinylethylchloride added and the mixture stirred at reflux for three hours. The cooled reaction mixture is washed with water and the dried organic fraction evaporated under reduced pressure yielding a brown oil. The crude material (0.05 mole) and 11.6 g. (0.10 mole) maleic acid are warmed in sufficient ethanol to cause solution (150 ml.) and allowed to stand overnight. The solids which form on cooling are collected by filtration yielding the product, M.P. 170–172° C. Recrystallization from 1000 ml. hot ethanol yields the product M.P. 174–175° C.

Analysis.—Calcd. for $C_{30}H_{35}N_3O_9$ (percent): C, 61.95; H, 6.06; N, 7.24; N.E., 145.4. Found (percent): C, 61.98; H, 6.25; N, 7.27; N.E., 146.0.

EXAMPLE V

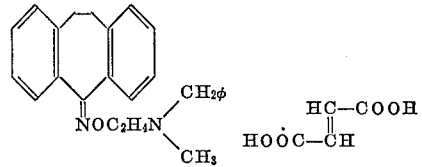

O-[β-(N-benzyl-N-methylamino)ethyl]-10,11-dihydrodibenzo[a,d]cyclohepten-5-one oxime A solution of 13.25 g. (0.06 mole) N-benzyl-N-methylaminoethyl chloride hydrochloride in 50 ml. water, covered with 50 ml. toluene, is saturated with potassium carbonate. The aqueous fraction is washed repeatedly with toluene, the toluene fractions are combined, dried and filtered.

A mixture of 6.68 g. (0.03 mole) 10,11-dihydrodibenzol[a,d]cyclohepten-5-one oxime and 1.4 g. (0.03 mole) 50% sodium hydride in 75 ml. dry toluene is stirred at reflux for one hour, cooled to 25° C. and the above solution of N-benzyl-N-methylaminoethyl chloride added and the mixture stirred at reflux for three hours. The cooled reaction mixture is washed with water and the dried organic fraction evaporated under reduced pressure yielding the crude product. The crude product (0.03 mole) and 3.48 g. (0.03 mole) fumaric acid are warmed in sufficient ethanol to cause solution (30 ml.), treated with Darco, filtered, diluted with 50 ml. ethyl ether and refrigerated. The solids which form on cooling are collected by filtration yielding the product, M.P. 128–131° C. Repeated recrystallization from isopropanol yields the pure product, M.P. 149–150° C.

Analysis.—Calcd. for $C_{29}H_{30}N_2O_5$ (percent): C, 71.58; H, 6.21; N, 5.75. Found (percent): C, 71.56; H, 6.15; N, 5.49.

EXAMPLE VI

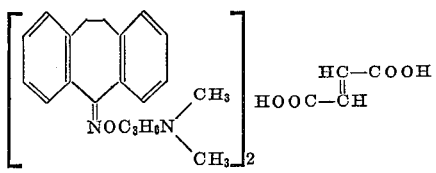

O-[γ-(N,N-dimethylamino)propyl]-10,11-dihydrodibenzo[a,d]cyclohepten-5-one oxime A mixture of 8.9 g. (0.04 mole) 10,11-dihydrodibenzo[a,d]cyclohepten-5-one oxime, 1.9 g. (0.04 mole) 50% sodium hydride and 100 ml. dry toluene is stirred at reflux for one hour, cooled to 25° C. and 4.86 g. (0.04 mole) freshly distilled γ-N,N-dimethylaminopropylchloride dissolved in 50 ml. dry toluene is added and the mixture stirred at reflux for three hours. The cooled reaction mixture is washed with water and the dried organic faction evaporated under reduced pressure yielding a brown oil. The crude product (0.038 mole) and 4.45 g. (0.038 mole) fumaric acid are warmed in sufficient ethanol to cause solution, filtered and allowed to cool. The solids which form on cooling are collected by filtration yielding the product, M.P. 172–179° C. A second crop of crystals is obtained by diluting the mother liquors to the cloud point with ethyl ether and collecting the solids which form by filtration. Recrystallization from 500 ml. hot isopropanol yields the pure product, M.P. 182–185° C.

Analysis.—Calcd. for $C_{44}H_{52}N_4O_6$ (percent): C, 72.09; H, 7.15; N, 7.64. Found (percent): C, 71.73; H, 7.20; N, 7.33.

EXAMPLE VII

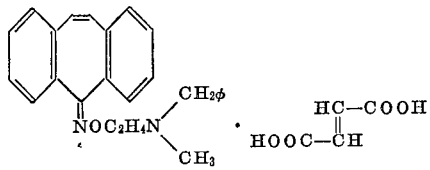

O-[β-(N-benzyl-N-methylamino)ethyl]-dibenzo[a,d]cyclohepten-5-one oxime

A solution of 49.7 g. (0.226 mole) β-(N-benzyl-N-methylamino)ethyl chloride hydrochloride in 100 ml. water, covered with 75 ml. toluene, is saturated with potassium carbonate. The aqueous fraction is washed repeatedly with toluene, the toluene fractions are combined, dried and filtered.

A mixture of 41.7 g. (0.188 mole) dibenzo[a,d]cyclohepten-5-one and 9.3 g. (0.188 mole) 50% sodium hydride in 400 ml. dry toluene is stirred at reflux for one hour, cooled to 20° C. and the above solution of β-(N-benzyl-N-methylamino)ethyl chloride is added and the mixture is washed with water and the dried organic fraction evaporated under reduced pressure yielding a heavy brown oil. The crude product (0.152 mole) and 13.1 g. (0.152 mole) fumaric acid are warmed in sufficient ethanol to cause solution (400 ml.), filtered, diluted to the cloud point with ethyl ether, 400 ml. of acetonitrile are added and the mixture is refrigerated. The solids which form upon standing are collected by filtration yielding the product, M.P. 215–220° C. Recrystallization from 750 ml. isopropanol and 200 ml. methanol to which a small amount of fumaric acid is added yields the pure product, M.P. 215–222° C. Additional product is available from work-up of mother liquors.

Analysis.—Calcd. for $C_{29}H_{28}N_2O_5$ (percent): C, 71.89; H, 5.82; N, 5.79. Found (percent): C, 72.6; H, 6.3; N, 6.3.

EXAMPLE VIII

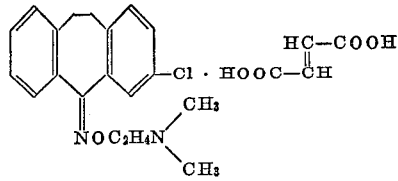

O-[β-(N,N-dimethylamino)ethyl]-3-chloro-10,11-dihydrodibenzo[a,d]cyclohepten-5-one oxime A mixture of 7.7 g. (0.03 mole) 3-chloro-10,11-dihydrodibenzo[a,d]cyclohepten-5-one oxime and 1.4 g. (0.03 mole) 50% sodium hydride in 100 ml. dry toluene is stirred at reflux for one hour, cooled to 20° C. and 3.5 g. (0.03 mole) freshly distilled β-dimethylaminoethyl chloride is added and the resulting mixture stirred at reflux for three hours. The cooled reaction mixture is washed with water and the dried organic fraction evaporated under reduced pressure yielding a dark brown oil. The crude product (0.029 mole) and 3.36 g. (0.029 mole) fumaric acid are warmed in sufficient ethanol to cause solution (35 ml.), diluted with an equal volume of ethyl ether and the solids which form are collected by filtration yielding the product, M.P. 140–143° C. The product is dissolved in 40 ml. hot isopropanol, treated with Darco, filtered and allowed to cool. The solids are collected by filtration yielding the pure product, M.P. 143–144° C.

Analysis.—Calcd. for $C_{23}H_{25}ClN_2O_5$ (percent): C, 62.08; H, 5.66; Cl, 7.97; N, 6.30. Found (percent): C, 62.25; H, 5.85; Cl, 7.96; N, 6.23.

EXAMPLE IX

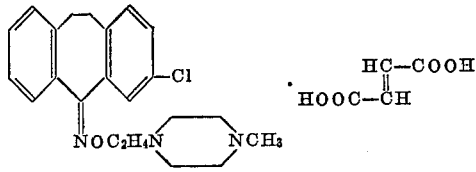

O-[β-(4-methyl-1-piperazinyl)ethyl]-3-chloro-10,11-dihydrodibenzo[a,d]cyclohepten-5-one oxime A solution of 8.4 g. (0.037 mole) 4-methyl-1-piperazinyl ethyl chloride hydrochloride in 50 ml. water, covered with 50 ml. toluene, is saturated with potassium carbonate. The aqueous fraction is washed repeatedly with toluene, the toluene fractions are combined, dried and filtered.

A mixture of 6.4 g. (0.025 mole) 3-chloro-10,11-dihydrodibenzo[a,d]cyclohepten-5-one oxime and 1.2 g. (0.025 mole) 50% sodium hydride in 100 ml. dry toluene is stirred at reflux for one hour, cooled to 25° C. and the above solution of 4-methyl-1-piperazinylethyl chloride is added and the resulting mixture stirred at reflux for three hours. The cooled reaction mixture is washed with water and the dried organic fraction evaporated under reduced pressure yielding a brown oil. The crude product (0.025 mole) and 5.8 g. (0.05 mole) fumaric acid are warmed in sufficient ethanol to dissolve (700 ml.), filtered and allowed to cool. The solids which form on cooling are collected by filtration yielding the product, M.P. 195–196° C. Recrystallization from 500 ml. hot ethanol yields the pure product, M.P. 195–196° C.

Analysis.—Calcd. for $C_{26}H_{30}ClN_3O_5$ (percent): C, 62.45; H, 6.05; Cl, 7.09; N, 8.40. Found (percent): C, 62.45; H, 6.14; Cl, 7.01; N, 8.42.

EXAMPLE X

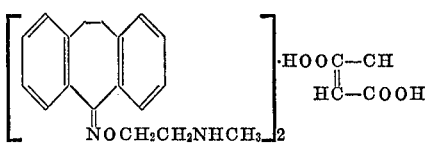

O-[β-(N-methylamino)ethyl]-10,11-dihydrodibenzo[a,d]cyclohepten-5-one oxime fumarate A mixture of 19.5 g. (0.15 mole) of methylaminoethyl chloride hydrochloride, 42.0 g. (0.2 mole) of trifluoroacetic anhydride and 200 ml. of dry benzene is refluxed gently for 4 hours. After stirring overnight at room temperature the solution is extracted with 5% sodium bicarbonate solution and dried. Removal of the solvent and distillation of the residue gives N-2-chloroethyl-N-methyl-α,α,α-trifluoroacetamide, B.P. 61–62°/4.3 mm.

*Analysis.*—Calcd. for $C_5H_7ClF_3NO$ (percent): C, 31.67; H, 3.72; Cl, 18.70; F, 30.06; N, 7.39. Found (percent): C, 31.39; H, 3.94; Cl, 18.98; F, 29.93; N, 7.37.

A mixture of 7.62 g. (0.034 mole) of 10,11-dihydrodibenzo[a,d]cyclohepten-5-one oxime, 1.3 g. (0.034 mole) of a 59% sodium hydride-oil dispersion and 200 ml. of dry toluene is refluxed for 1 hour. The mixture is cooled to 20° and a solution of the above amide (6.45 g., 0.034 mole) in 25 ml. of dry toluene is added dropwise. The mixture is refluxed overnight and cooled to room temperature. Water (35 ml.) is added, the asueous phase separated and the toluene removed from the organic layer. The residue is then stirred with a solution of 1.9 g. of potassium hydroxide in 100 ml. of ethanol for 60 hours. The ethanol is then distilled, the residue taken up in ether and this solution extracted with several portions of 6 N hydrochloric acid. The acid extracts are made basic with solid potassium carbonate and the oil which separates extracted into ether. After drying over potassium carbonate the ether is removed and the oil treated with 0.81 g. of fumaric acid in 10 ml. of ethanol to give a precipitate of the desired oxime (1.15 g., 10%), M.P. 179–182° C. Recrystallization from isopropanol gave an analytical sample, M.P. 180–182° of O-[β-(N-methylamino) ethyl] - 10,11 - dihydrodibenzo [a,d] cyclohepten-5-one oxime fumarate.

EXAMPLE XI

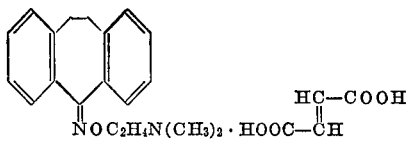

O-[β-(N,N-dimethylamino)ethyl]-10,11-dihydrodibenzo[a,d]cyclohepten-5-one oxime

A mixture of 4.5 g. (0.02 mole) of 10,11-dihydrodibenzo[a,d]cyclohepten-5-one oxime and 1.0 g. (0.02 mole) 50% sodium hydride in 100 ml. dry toluene is heated to reflux for one hour. The mixture is cooled to 20° C. and 6.4 g. (0.06 mole) of freshly distilled β-N,N-dimethyl aminoethyl chloride in 20 ml. dry toluene is added and the resulting mixture is stirred under reflux for three hours. Upon cooling 20 ml. water is added, the layers separated and the organic fractions are washed with water. The dried organic fractions are evaporated under reduced pressure yielding an oily residue. The above residue and 2.3 g. (0.02 mole) of fumaric acid are dissolved in 100 ml. ethanol, diluted to the cloud point with 125 ml. ethyl ether and refrigerated. The solids which form are collected by filtration, triturated under acetone and acetonitrile yielding the product, M.P. 140–142°.

*Analysis.*—Calcd. for $C_{23}H_{26}N_2O_5$ (percent): C, 67.30; H, 6.38; N, 6.82. Found (percent): C, 67.49; H, 7.54; N, 6.82.

EXAMPLE XII

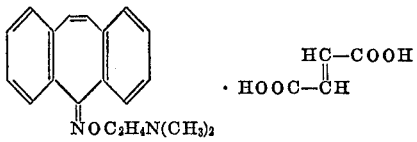

O-[β-(N,N-dimethylamino)ethyl]dibenzo[a,d]cyclohepten-5-one oxime

A mixture of 1.4 g. (0.03 mole) 50% sodium hydride, 6.6 g. (0.03 mole) dibenzo[a,d]cyclohepten-5-one oxime and 75 ml. dry toluene is heated under reflux for one hour and cooled. To this mixture is added 6.4 g. (0.06 mole) freshly distilled β-(N,N-dimethylamino)ethyl chloride dissolved in 20 ml. dry toluene. The resulting mixture is stirred under reflux for two hours. Upon cooling 25 ml. water is added, the layers separated and the organic fractions washed with water. The dried organic fraction is evaporated under reduced pressure yielding a brown oil. The residues and 3.5 g. (0.03 mole) fumaric acid are dissolved in 60 ml. warm ethanol and treated with Darco, filtered and allowed to cool. The solids which form are collected by filtration yielding the product, M.P. 159–160°.

*Analysis.*—Calcd. for $C_{23}H_{24}N_2O_5$ (percent): C, 67.63; H, 5.92; N, 6.86. Found (percent): C, 67.51; H, 5.99; N, 6.87.

Various changes and modifications of the invention can be made and to the extent that such variations incorporate the spirit of this invention they are intended to be included within the scope of the invention as such modifications will be obvious to those skilled in the art.

What is claimed is:

1. A compound selected from the group consisting of compounds having the formula

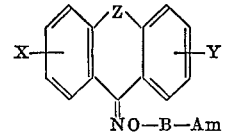

and nontoxic physiologically acceptable acid addition salts thereof wherein Z is a member selected from the group consisting of —CH=CH— and —CH$_2$—CH$_2$—, X and Y are selected from the group consisting of hydrogen, halogen, lower alkyl, S-lower alkyl, O-lower alkyl and trifluoromethyl, B is an alkylene of 1 to 3 carbon atoms and Am is

wherein R$_1$ and R$_2$ may be selected from the group consisting of hydrogen, lower alkyl, phenyl and phenyl lower alkyl.

2. A compound of claim 1 wherein Z is —CH$_2$—CH$_2$—, B is a lower alkylene of 1 to 3 carbon atoms, X is hydrogen, Y is hydrogen or chlorine, and R$_1$ and R$_2$ are lower alkyls.

3. A compound of the formula

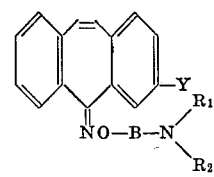

in which Y is hydrogen or chlorine, B is an alkylene of 1 to 3 carbon atoms and R$_1$ and R$_2$ are selected from hydrogen, lower alkyl or phenyl-lower alkyl.

4. A compound of the formula

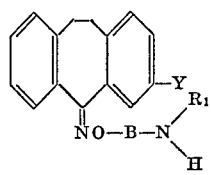

in which Y is hydrogen or chlorine, B is an alkylene of 1 to 3 carbon atoms and $R_1$ is lower alkyl.

5. O-[γ-(N,N-dimethylamino)propyl] - 10,11 - dihydrodibenzo[a,d]cyclohepten-5-one oxime.

6. O-[β-(N,N-dimethylamino)ethyl] - 3 - chloro-10,11-dihydrodibenzo[a,d]cyclohepten-5-one oxime.

References Cited

UNITED STATES PATENTS 3,270,055  8/1966  Engelhardt et al. ---- 260—566

FOREIGN PATENTS 303,843  2/1965  Spain.
1,204,219  11/1965  Germany.

ROBERT V. HINES, Primary Examiner

U.S. Cl. X.R.

260—268, 294.7, 326.5, 340.5, 456, 501.14, 561, 570.9, 590; 424—250, 267, 274, 327